Nov. 14, 1950     R. B. HOUCK     2,529,944
MULTIPLE IMAGE VIEW FINDER
Filed Feb. 24, 1948
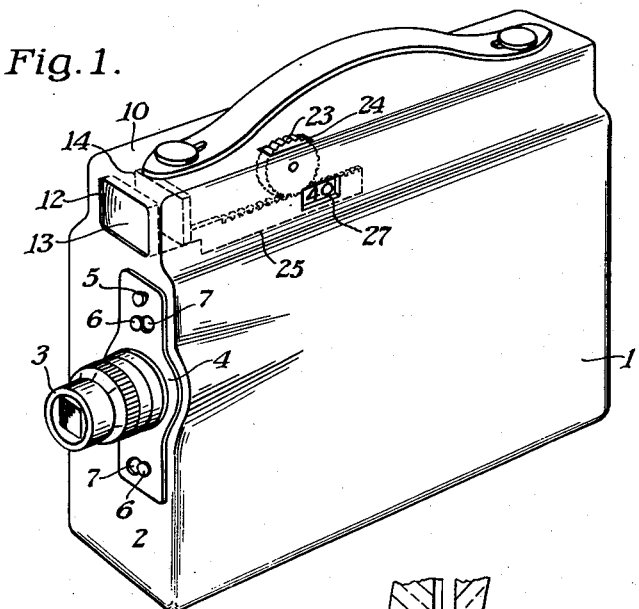
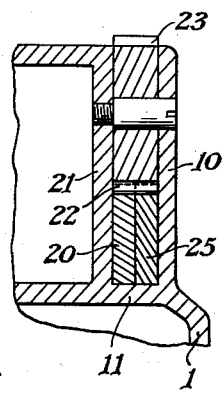
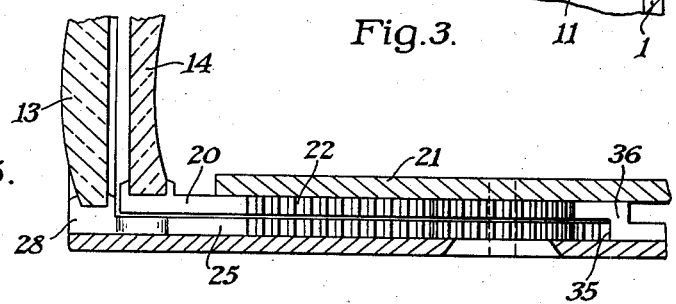
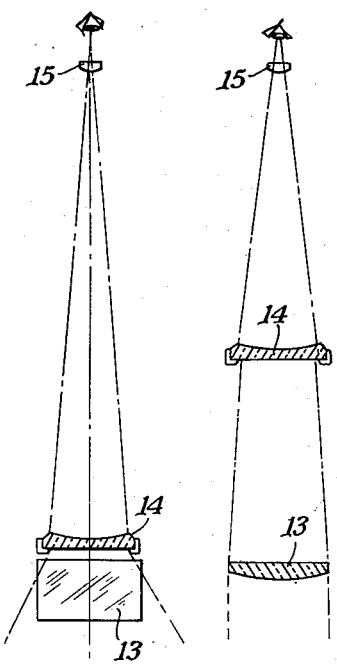
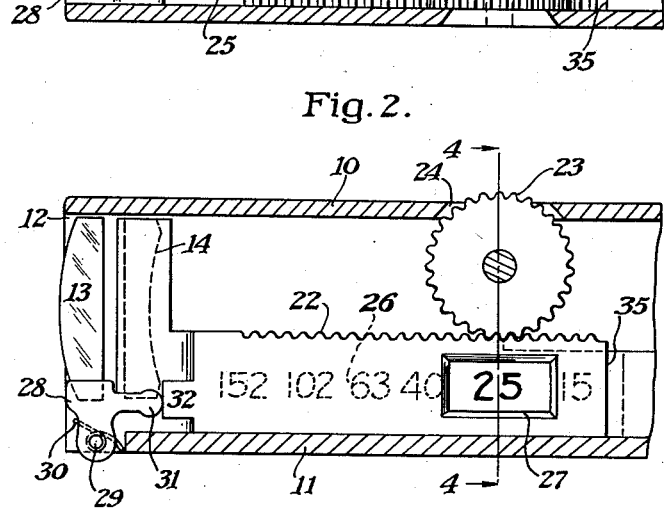
Robert B. Houck
INVENTOR
BY
ATTORNEYS Patented Nov. 14, 1950

2,529,944

UNITED STATES PATENT OFFICE 2,529,944

MULTIPLE IMAGE VIEW FINDER

Robert B. Houck, Rochester, N. Y., assignor to Eastman Kodak Company, Rochester, N. Y., a corporation of New Jersey Application February 24, 1948, Serial No. 10,267

3 Claims. (Cl. 88—1.5)

The present invention relates to view finders for use with photographic cameras and particularly to adjustable view finders in which the field of view can be altered to correspond to interchangeable lenses of different focal lengths.

In U. S. Patent 2,043,900 which issued June 9, 1936, J. Mihalyi describes an adjustable view finder of this type particularly suitable for use on a motion-picture camera, but not restricted to such use. When using a finder as therein described, the front component, comprising a fixed positive element and an adjustable negative element, axially spaced therefrom, forms a virtual image of any subject viewed, at a distance which varies with the movement of the adjustable element. In order to extend the range of the finder to wide-angle camera objectives, i. e., 15-mm., the front positive element is pivoted so that it can be moved out of the system whereby the virtual image of the subject is then formed by the negative element alone when it is moved to its extreme forward position. In the Mihalyi arrangement, the operator has to remember to move the front positive element out of the system when adjusting the finder in accordance with wide-angle objectives. What is more important is that when returning to the use of a longer focal length objective after using a short focus wide-angle objective, the operator must remember to return this front positive element to the system. This is the step that is very often forgotten because there is nothing to indicate to the operator that the field of his finder does not correspond with that of the focal length camera objective being used.

A primary object of the present invention is to improve the Mihalyi finder system referred to, and to provide a finder system wherein the front positive element is automatically moved out of the finder system when the system is adjusted for use with wide-angle short focal length camera objectives as indicated by a scale calibrated in objective focal lengths.

Another object is to provide a finder system of the type set forth in which the front positive element is automatically returned to the system when the system is adjusted for use with longer focal length objectives after having previously been adjusted for use with a short focal length objective.

And still another object is to provide an improved finder system of the type set forth which is simple and rugged from the structural standpoint, which is inexpensive, and is compact enough to be used in a finder housing which will fit on the top of a motion-picture camera.

The novel features that I consider characteristic of my invention are set forth with particularity in the appended claims. The invention itself, however, both as to its organization and its methods of operation, together with additional objects and advantages thereof, will best be understood from the following description when read in connection with the accompanying drawings, in which Fig. 1 is a perspective view of a motion-picture camera provided with a view finder constructed in accordance with a preferred embodiment of the present invention;

Fig. 2 is a partial vertical section taken longitudinally of the front end of the finder housing on an enlarged scale, and showing the mechanism for adjusting the optical members of the finder system;

Fig. 3 is a horizontal section of the finder corresponding to Fig. 2;

Fig. 4 is a sectional view taken substantially on line 4—4 of Fig. 2;

Fig. 5 is a schematic view showing the finder elements adjusted for a camera objective of normal or long focal length; and Fig. 6 is a view similar to Fig. 5 but with the finder elements adjusted for a wide-angle, short focal length camera objective.

Like reference characters refer to corresponding parts throughout the drawings.

Fig. 1 shows a well-known type of so-called "amateur size" motion-picture camera which may be utilized for taking motion pictures on small size film, such as the well-known 16-mm. and 8-mm. film. The camera may consist of a body portion 1 on the front wall 2 of which an objective shown generally at 3 may be positioned. This objective may be carried by a removable lens mount 4 of any well-known type and is here shown as being a removable mount of the type shown in U. S. Patent 1,736,436, Fuerst, November 19, 1929.

By removing the lens mount through release of the latch 5 and turning the mount until the studs 6, which hold the mount in position, can pass through the apertures 7—all as fully described in the above-mentioned patent—different focal length objectives can be placed on the camera. For cameras of this type, it is customary to supply objectives ranging from 15-mm. to 152-mm. in focal length. Any of these can be attached to the camera front 2.

On the top of the camera body 1, I provide a finder housing 10 which is substantially rectangular in shape and extends the full length of the camera body. The bottom of this finder housing is the top wall 11 of the camera body (see Fig. 2) and the housing serves to enclose the optical elements making up the view finder system. The view finder system includes a window 12 in the front wall of the housing 10, a front negative component comprising positive lens 13 and negative lens 14 and an ocular 15 mounted in the rear wall of the housing. See Figs. 5 and 6.

In this type of finder system the front negative component comprising lenses 13 and 14 forms a virtual image of the subject in front of the camera and which is reimaged by the ocular 15 as another virtual image. By changing the axial spacing between the elements 13 and 14, the distance at which the virtual image is formed thereby is altered and this results in a change in the size of the field of view of the system. As the separation between the elements 13 and 14 increases, the size of the field of view of the system decreases so that for use with 152-mm. camera objectives, the elements 13 and 14 will be separated by the maximum amount, while to give a field corresponding to a 25-mm. objective the two elements will be as close together as possible.

Changes in field size corresponding to camera objectives of focal lengths ranging from 152-mms. to 25-mms. can be readily accommodated by adjusting the negative lens 14 relative to the positive lens 13. However, in order to accommodate an objective of 15-mm. focal length which has a field of fairly wide angle, it is necessary to move the negative lens 14 to an extreme forward position and then remove the positive lens 13 from the system. Removing the positive lens 13 from in front of the negative lens has the effect of increasing the negative power of lens 14 and then lens 14 alone forms a virtual image of the subject at a distance in front of the camera which gives a field of view corresponding to the 15-mm. objective. In Figs. 5 and 6 I have illustrated how changing the spacing of lenses 13 and 14 and/or removing the lens 13 from the system alters the size of the field of view. Fig. 5 shows how spacing the negative lens 14 the maximum distance from the lens 13 reduces the size of the field of view to correspond with objectives of long focal length, i. e., 152-mm. Fig. 6 illustrates how moving the negative lens 14 to its extreme forward position and removing the lens 13 from the system produces a wide angle field of view to correspond with the field of a short focal length objective, i. e., 15-mm.

The optics of this finder system per se is not the present invention but is completely disclosed in the above-noted patent. The present invention has to do with the novel means I have provided for obtaining the necessary adjustment of the optical elements of the system and particularly to an adjusting means which results in the positive element 13 being automatically removed from, and reinserted into, the system upon adjustment of the system in accordance with a scale calibrated in focal lengths of camera objectives to be used.

Coming now to the present invention, the negative lens 14 of the finder system is mounted on the front end of a slide or rack member 20 which extends longitudinally of the finder housing and is confined to a longitudinal sliding movement by a wall 21 spaced from the outside wall of the housing 10. The top edge of the slide 20 is provided with gear teeth 22 which are engaged by a pinion 23 journaled in the two walls of the housing at a point above the top edge of the slide. (See Fig. 4.) The periphery of the pinion extends through a slot 24 in the top wall of the housing 10 (see Figs. 1 and 4) so that it can be engaged by the thumb to adjust the negative lens 14 relative to the positive lens 13 to change the field of view of the system.

To indicate the field of view for which the system is adjusted as the negative lens 14 is moved axially relative to the positive lens 13, a second rack member 25 is disposed in side-by-side relation with slide member 20 and is adapted to slide longitudinally of the finder housing with and/or relative to the slide member 20. The teeth on the top edge of this rack member are flush with the teeth 22 on the slide member 20 and are also engaged by the pinion 23. The outside face of the rack 25 has a scale 26 of objective focal lengths stamped therein and which scale is adapted to be viewed through a window 27 in the side of the finder housing. This window is of such size that only one value on scale 26 can be observed at any one time so that when the 25 shows in the window (see Fig. 2), it means that the system is adjusted to give a field of view corresponding to a 25-mm. objective, or if the 40 shows through the window, as shown in Fig. 1, it indicates the system is adjusted in accordance with a 40-mm. objective.

As shown in Fig. 2, the lens 13 is carried by a mount 28 which is rotatably supported on a pin 29 extending transversely of the finder housing so that the lens 13 can be pivoted forwardly and downwardly and out of the system to the position indicated in Fig. 6. The lens 13 is normally moved into the system through the action of the spring 30, encircling the pin 29, and having one end acting on the mount 28. The mount 28 includes a projection 31 which is adapted to be engaged by a lug 32 on the forward end of the rack member 25 whereby the rack member can act as a ram to push the lens 13 out of the system when the finder is adjusted for the 15-mm. field.

Between positions for the 152-mm. field and the 25-mm. field, both the slide member 20 and the rack member 25 are driven by the pinion 23 as a unit and the lens 13 remains in the system as illustrated in Figs. 2 and 3. At the 25-mm. position the teeth 22 of the slide member 20 are driven off of the pinion 23 and the negative lens 14 remains in the position illustrated in Fig. 2 by a detent action, not shown, but which could comprise a spring-pressed ball carried by slide member 20 and adapted to snap into a recess in the top of the camera body when the slide reaches this position of adjustment. In further adjusting the finder system to the 15-mm. position, rack member 25 is alone driven by pinion 23 and causes lug 32 thereon to push against projection 31 to tip the lens 13 down and out of the system.

In adjusting the finder from the 15-mm. position to the 25-mm. position, the rack member 25 moves away from the projection 31 and the lens 13 rises to its vertical position and back into the system because of the action of spring 30. At the 25-mm. position of adjustment the rear end 35 of rack member 25 establishes direct contact with an offset 36 in the slide 20 and forces the latter back into mesh with the pinion 23. Once again, the slide member 20 and rack 25 are driven together as one member and the system is ready for adjustment in accordance with any of the objectives of the longer focal length.

Thus is provided an adjusting mechanism for a multiple image view finder system of the type disclosed which causes the positive lens of the front negative component to be automatically positioned in, or removed from, the system upon adjustment of the system to the desired field size with the aid of a scale marked in objective focal lengths. The mechanism is compact enough to be readily accommodated in a finder housing only slightly wider than one not incorporating such a mechanism and possessing the advantages derived therefrom. Although it is simple and rugged in construction and is relatively inexpensive, this adjusting mechanism is as efficient as any previously devised adjusting means for such a finder system.

Although I have shown and described certain specific embodiments of my invention, I am fully aware that many modifications thereof are possible. My invention therefore is not to be limited to the precise details of construction shown and described but is intended to cover all modifications coming within the scope of the appended claims.

Having thus described my invention, what I claim is new and desire to secure by Letters Patent of the United States is:

1. A view finder system for viewing a subject and adapted to have an adjustable field of view to correspond to camera lenses of different focal length and comprising a negative front component including axially spaced positive and negative lenses forming a virtual image of the subject at a distance varying with the spacing between said two lenses, an ocular for reimaging said virtual image to form another virtual image, means for mounting said positive lens so that it can be moved from the system when the negative lens is moved to an extreme forward position in which it alone forms a virtual image of the subject at a distance beyond the range of said two lenses in combination, a slide member carrying said negative lens to adjust it axially of the system, a scale member slidably mounted in side-by-side relation with said slide member and calibrated in camera lens focal lengths which cooperate with a stationary index, the adjacent edges of each of said slider and scale members provided with gear teeth, a pinion in toothed engagement with both of said slider and scale members for adjusting them simultaneously until the slider member assumes the position in which the negative lens reaches its extreme forward position at which time its teeth disengage the pinion and further adjustment of the pinion in moving the scale member to bring the shorter focal length reading opposite the index causes the scale member to engage and move the positive lens out of the system.

2. A view finder system according to claim 1 in which said positive lens is carried by a pivoted mount to swing into and out of the finder system, a spring normally acting to move the positive lens into the system, a projection on the mount adapted to be engaged by the forward end of said scale member when the same is moved independently of said slider member and cause the positive lens to be moved out of said system, and a connection between said slider and scale members whereby when the scale member is adjusted rearwardly to allow the positive lens to return to the system it engages and moves the slider member back into driving engagement with said pinion.

3. A view finder system for viewing a subject and adapted to have an adjustable field of view to correspond to camera lenses of different focal length and comprising a negative front component including axially spaced positive and negative lenses for forming a virtual image of the subject, an ocular for reimaging said virtual image to form another virtual image, said negative lens mounted on a slide to be moved thereon axially relative to said positive lens to vary the distance at which the first virtual image is formed and, hence, cause a change in the size of the field of view of the entire system, said positive lens removable from the entire system so that the negative lens alone, when adjusted to an extreme forward position, will form the first virtual image at a distance beyond the range of said two lenses in combination and thus produce a field of view corresponding to the field of a camera lens of shorter focal length than can be accommodated by the system including said positive and negative lenses in combination, a scale calibrated in focal lengths and movable to and from an extreme position in which it engages and moves the positive lens out of the system and in which position the scale thereon indicates a focal length lens shorter than can be accommodated by the combined use of the positive and negative lenses; a single adjusting member for adjusting said slider and scale member simultaneously, the driving connection between the adjusting member and these parts being such that when the negative lens reaches its extreme forward position, the driving connection between the adjusting member and the slider is broken, while further adjustment of the adjusting member moves the scale member to its extreme position.

ROBERT B. HOUCK.

REFERENCES CITED

The following references are of record in the file of this patent:

UNITED STATES PATENTS

| Number | Name | Date |
| --- | --- | --- |
| 741,102 | Borsum | Oct. 13, 1903 |
| 1,789,289 | Azarraga | Jan. 20, 1931 |
| 1,991,530 | Walker | Feb. 19, 1935 |
| 2,043,900 | Mihalyi | June 9, 1936 |

FOREIGN PATENTS

| Number | Country | Date |
| --- | --- | --- |
| 624,467 | Germany | Jan. 21, 1936 |